United States Patent
Tsailianis et al.

(10) Patent No.: US 9,896,155 B2
(45) Date of Patent: Feb. 20, 2018

(54) SYSTEM FOR THE ELECTRICAL PROPULSION OF LIGHT-WEIGHT WHEELED TRANSPORTATION VEHICLES

(71) Applicants: Ioannis Tsailianis, Kifissia (GR); Symeon Effraimiadis, Neo Iraklio (GR)

(72) Inventors: Ioannis Tsailianis, Kifissia (GR); Symeon Effraimiadis, Neo Iraklio (GR)

(*) Notice: Subject to any disclaimer, the term of this patent is extended or adjusted under 35 U.S.C. 154(b) by 0 days.

(21) Appl. No.: 15/025,409

(22) PCT Filed: Sep. 29, 2014

(86) PCT No.: PCT/GR2014/000054
§ 371 (c)(1),
(2) Date: Mar. 28, 2016

(87) PCT Pub. No.: WO2015/044695
PCT Pub. Date: Apr. 2, 2015

(65) Prior Publication Data
US 2016/0236747 A1    Aug. 18, 2016

(30) Foreign Application Priority Data

Sep. 27, 2013   (GR) .............................. 20130100550

(51) Int. Cl.
*B62M 6/55* (2010.01)
*F16H 1/00* (2006.01)
*F16H 1/28* (2006.01)

(52) U.S. Cl.
CPC ............... *B62M 6/55* (2013.01); *F16H 1/003* (2013.01); *F16H 1/28* (2013.01)

(58) Field of Classification Search
CPC ....................................................... F16H 1/28
See application file for complete search history.

(56) References Cited

FOREIGN PATENT DOCUMENTS

| DE | 102010051727 A1 | 5/2012 |
|----|-----------------|--------|
| EP | 0937600 A2 | 8/1999 |
| EP | 0986034 A2 | 3/2000 |
| JP | H08207873 A | 8/1996 |
| JP | H08244673 A | 9/1996 |
| JP | H09183394 A | 7/1997 |
| WO | 2009098647 A2 | 8/2009 |

*Primary Examiner* — Derek D Knight
(74) *Attorney, Agent, or Firm* — Porzio Bromberg & Newman P.C.

(57) ABSTRACT

An electrical propulsion system for bicycles (E-bike) is claimed. The system comprises an electric motor, at least three speed reduction stages and an output gear (driven gear). The motor has an output shaft oriented towards one side of the system, while the output gear is located on the opposite side of the system. The first and second reduction stage are located on the same side as the drive gear which is mounted on the output shaft of the motor. The sub-claims specify the first reduction stage to be a planetary gear set and specify the location of the third reduction stage. Further is the motor defined as high speed motor and is the system specified as module for mounting to a bicycle bottom bracket.

7 Claims, 3 Drawing Sheets

SYSTEM FOR THE ELECTRICAL PROPULSION OF LIGHT-WEIGHT WHEELED TRANSPORTATION VEHICLES

FIELD OF THE INVENTION

The invention refers to electrical engines used for the propulsion of bicycles, scooters or any other means of light-weight wheeled transportation vehicles and robotic applications.

STATE OF THE ART

Known electrical engines for use in the propulsion of bicycles, scooters or any other means of light-weight wheeled transportation vehicles are of the following two types: Wheel-drive hub engines, wherein the electrical engine is located in the wheel and Mid-drive engines, wherein the electrical engine is located on the bicycles mid-drive.

Wheel-drive hub engines are motors where the bicycle wheel turns together with the motor's rotor and the motor's axle is also the wheel's axle.

In wheel-drive hub electrical engines the motion is directly transmitted to the wheel and as a result the speed of the motor is the same as that of the wheel and because of that they usually have electric motors which are large, heavy and low speed . . . . Other important disadvantages of wheel-drive hub engines are that they produce high rolling resistance, they have low power-to-weight ratio, their propulsion is single-speed and they add substantial weight to the wheels, which alters the riding geometry and balance of the bicycle.

The above disadvantages make the wheel-drive hub motors incompatible for use in high power propulsion systems of modern bicycles including mountain bikes, which have lightweight components.

On the other hand, known and commercially available mid-drive engines have high weight and volume in proportion to the size and the weight of a bicycle. Due to their size and shape, mid-drive engines can be used only on bicycle frames that are specifically designed for the specific engine only. This means that the known mid-drive engines cannot be used or added on any commercially available bicycle frame.

The installation of the known mid-drive engines alters the known distribution of forces that apply to a bicycle frame. Namely, in mid-drive electrical engines the bottom-bracket is fastened to the electrical engine and this electrical engine is in turn fastened on the bicycle frame, whereas normally in bicycles the bottom bracket is fastened to the bicycle frame directly. The result is that in the case that the bottom bracket is not fastened directly to the frame, when high forces are applied the bicycle's crank set, the bottom bracket bents and it may brake. The application of high forces is usual for bicycles, i.e. as is the case of mountain bikes. Also, because mid-drive engines are engines often made of plastic materials, the support of the bottom bracket becomes deformed very fast and the bicycle fails to operate properly.

The serious disadvantage of the existing equipment and systems used so far for the electrical propulsion of bicycles, scooters or any other means of light-weight wheeled transportation vehicles is that it alters the fundamental principles of the devices on which they are applied. This is the case either when such equipment and systems are added to alter an existing non-electrical device and turn it into an electrically propelled device, or when such equipments and systems are included in the initial manufacture stage of a vehicle.

The result is that, for example a bicycle on which a known electrical engine is applied for its conversion into an electrically propelled bicycle (as is the case of a hub motor), can no longer be considered as a bicycle. The reason is the serious increase in weight and the non-equal weight distribution. Also, the existing hub motor electrical engines affect and reduce the strength of the bicycle frame due to the high mass of the engines used proportionally to the size and the weight support capability of the bicycle.

As for the mid-drive engines known so far, most cannot apply to any bicycle frame, but need to be in the initial design of the bicycle. As for the very few known mid-drive engines that may theoretically be applied to different bicycle frames at a later stage, these are particularly heavy and large in size and weight over four (4) kilograms.

The significantly larger size of all the known mid-drive engines has the important disadvantage that the clearance from the ground of the vehicle is diminished substantially, and this presents a significant driving restriction for all vehicles, especially for driving on uneven surfaces. In the case of mountain bikes this is a very significant disadvantage.

It is known that mid-drive engines have the following necessary features:

In the known electrical propulsion engines the motor's driving shaft that transmits power to the engine is always parallel to the bottom bracket of the bicycle and the motor's pinion gear is looking towards the side of the bicycle where takes place the transmission of power via a chain to the rear wheel of the bicycle (also called the chain drive of the bicycle).

In most known bicycles there is a drive side and a non-drive side. The drive side, where takes place the transmission of power from the pedal cranks to the rear wheel, is usually on the right side of the rider. The drive-side comprises the bicycle's chain or synchronous belt, the chain ring and the rear gear changing system. The known electrical engines' motor output pinion shaft is facing the same side as the drive side, namely it is facing the side which has the following components: the chain ring, chain or belt and gear changing system.

As for the non-driving side, there are no chain sprockets for the transmission of power to the rear wheel.

DESCRIPTION OF THE INVENTION

It is the object of the present invention to present an electrical engine for the propulsion of any type of light-weight wheeled transportation vehicles and robotic applications, including but not limited to bicycle frames, which has the following optimal features that are not found in the prior art: low weight, small size, central weight distribution and high power. This electrical engine does not need to be a permanent fixture of the vehicles and robotic applications on which it applies, but can be fastened and unfastened quickly and effortless.

More specifically:

The present invention describes a system for electrical engines which is used for the propulsion of bicycles, scooters or any other means of light-weight wheeled transportation vehicles and robotic applications, the said system characterized in that:

it comprises at least three, or more, speed reduction stages, the output gear (19) of the pinion shaft (18) gear of the motor (1) is always directed towards the opposite side of the output (14) of the shaft (8) of the engine where it transfers the motion from the engine to the wheels, the first speed reduction stage (19, 20, 22) and the second (4, 5) speed reduction stages are facing always on the same side and the system output pinion gear shaft (19, 18) of the motor (1) that transmits the motion to the first speed reduction stage (19, 20, 22) is always on the opposite side of the last speed reduction stage (14, 15).

Preferably, the said system comprises:

a motor (1), a planetary drive (2) directly mounted on the motor's (1) pinion shaft output gear (18, 19), as a first stage of speed-reduction, at least two gears (4,5) as the second stage of speed reduction, a one-way bearing (6), a shaft (8) that transmits the power from the previous before the last reduction stage (4,5) to the last reduction stage (14,15), which shaft (8) is parallel to the bicycle's bottom bracket (11) and to the axle (18) of the motor (1), the last reduction stage which comprises at least two gears (14,15), and the last gear (14) is on the opposite side of the motor's (1) pinion shaft output (18,19), wherein the motor's pinion output shaft is always directed on the opposite side of the last reduction stage.

Advantageously, in the system of the present invention the motor (1) is a high speed motor (i.e. 3.000-10.000 rpm).

Preferably, in the system of the present invention the one-way bearing (6) is positioned inside the large gear (5) of the second reduction stage, which large gear (5) must then be hollow.

Advantageously, in the system of the present invention the one-way bearing (6) is positioned inside any one of the gears (14, 15) of the last reduction stage, which must then be hollow.

Preferably the system of the present invention is supported on parallel mounting plates (3) and housing (23) which is then fastened on the bottom bracket (11) of the bicycle with mounting brackets (10).

The system of the present invention applies to any ready bicycle frame or may be incorporated in the production stage of the bicycle's frame.

Preferably, in the system of the present invention the same housing system (23, 3) comprises the bottom bracket (11) and the axle (12) that exists in the bottom bracket (11) and the said housing (23, 3) is incorporated inside a bicycle frame.

A considerable advantage of the system of the present invention is that it does not need to be a permanent fixture of the vehicles and robotic applications on which it applies, but it can be easily fastened and unfastened at will, with no special technical knowledge.

FIGURES

The invention is illustrated with figures from 1 to 4, which must be regarded indicatively and should not be considered restrictively as to the scope of the invention.

DETAILED DESCRIPTION OF THE FIGURES

Figure 1:
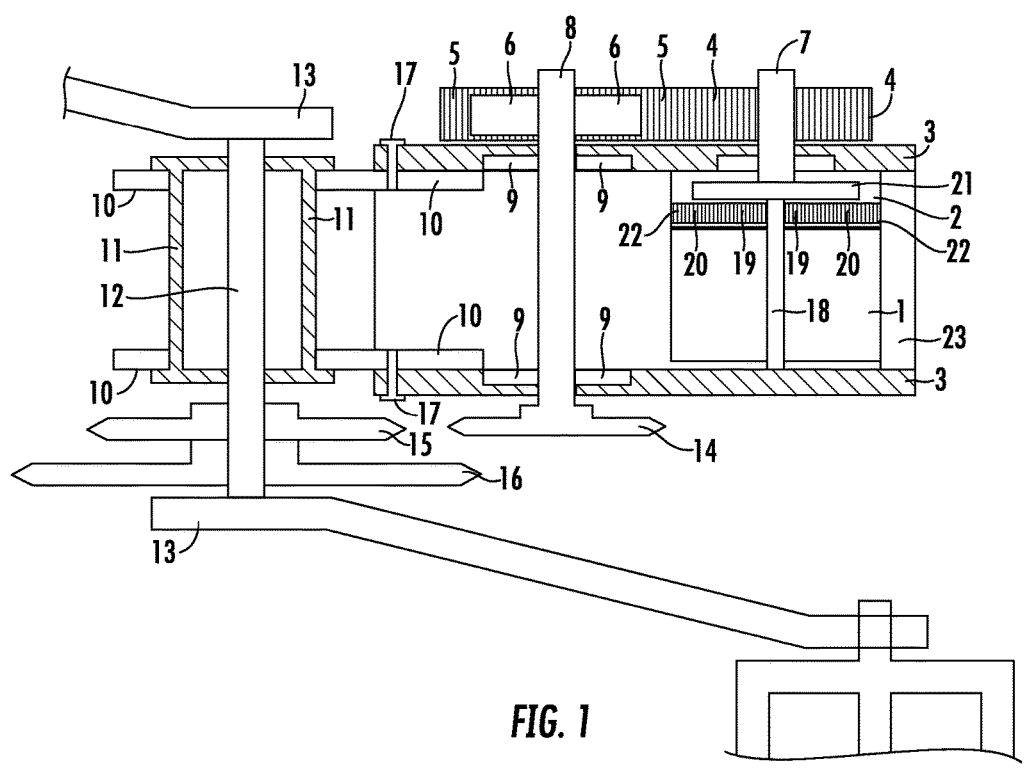
FIG. 1 shows a cut-through top view of the system disclosed in the present invention mounted on a bicycle frame.

In FIG. 1 the following numbers show specific features of the system of the present invention:

1. Motor
2. Planetary speed reducer
3. Parallel mounting plates
4. First gear (small) of the secondary speed reduction stage
5. Second gear (big) of the secondary speed reduction stage
6. One-way bearing sprag type
7. Axle (also herein referred to as shaft) of the planetary gear reduction stage
8. Axle (also herein referred to as shaft) that connects the big gear (5) of the second speed reduction stage and the one-way bearing system (6) with the chain sprocket (14) that transmits the power to the bicycle chain sprocket (15).
9. Ball bearings that support the axle (8) on the mounting plates (3).
10. Brackets that connect the engine to the bicycle frame and are fastened on the bottom bracket.
11. Bicycle's bottom bracket, namely the housing that supports the axle that connects the two pedal cranks.
12. Bicycle's bottom brackets axle.
13. Bicycle's crank set, namely the pedal arms.
14. Engine's chain sprocket drive, which is in the third speed reduction stage (small sprocket).
15. Bicycle's front chain sprocket drive-third reduction stage (big sprocket).
16. Bicycle's front chain ring (sprocket) that transmits power to the rear wheel through a chain.
17. Fasteners, that fasten the parallel plates (3) with the brackets (10) which are fastened to the bottom bracket (11).
18. Motor's pinion output shaft, namely the point where the power is transmitted by the motor to the engine.
19. Sun gear, namely the planetary gear of the first speed reduction stage, which is connected to the motor's (1) output shaft (18) to form the output pinion shaft system (18, 19).
20. Planet gears (planetary speed reduction gearbox).
21. Planet gear carrier (planetary speed reduction gearbox).
22. Ring gear (planetary speed reduction gearbox).
23. Housing that holds apart the parallel plates (3) and encloses the engine.

Figure 2:
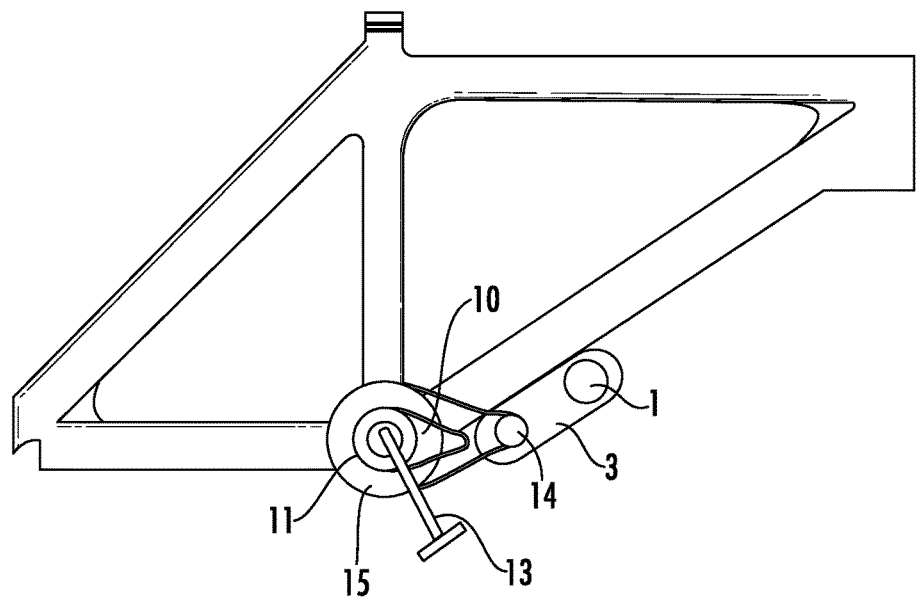
FIG. 2 shows a side view of the system of the electrical engine (motor) disclosed in the present invention mounted on a bicycle frame, seen from the drive-side of the bicycle.

FIG. 2 shows the system of the present invention mounted on a bicycle which is seen from the bicycle's driving side.

Figure 3:
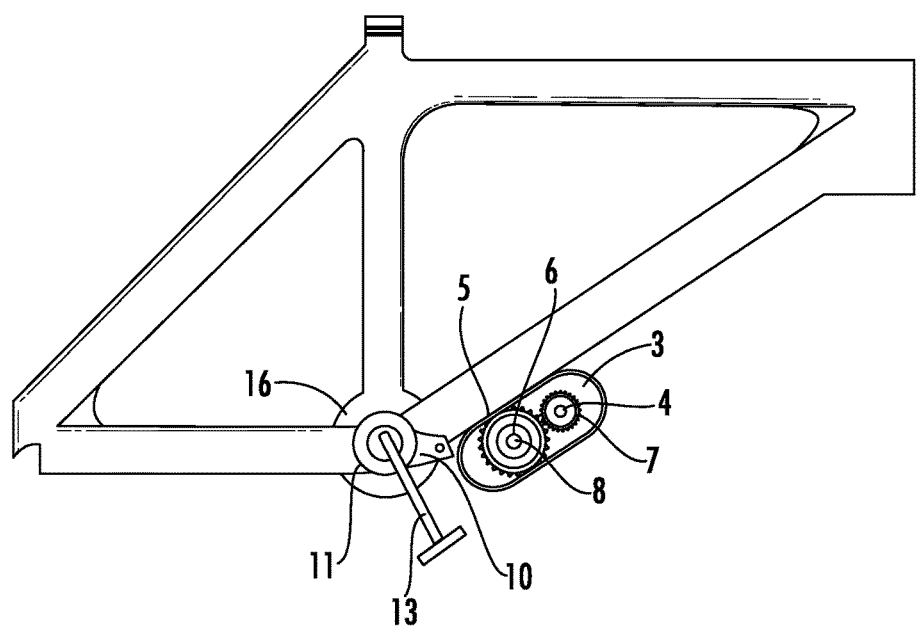
FIG. 3 shows a side view of the system of the electrical engine disclosed in the present invention mounted on a bicycle frame, seen from the non-drive-side of the bicycle.

FIG. 3 shows the system of the present invention mounted on a bicycle which is seen from the bicycle's non-driving side.

Figure 4:
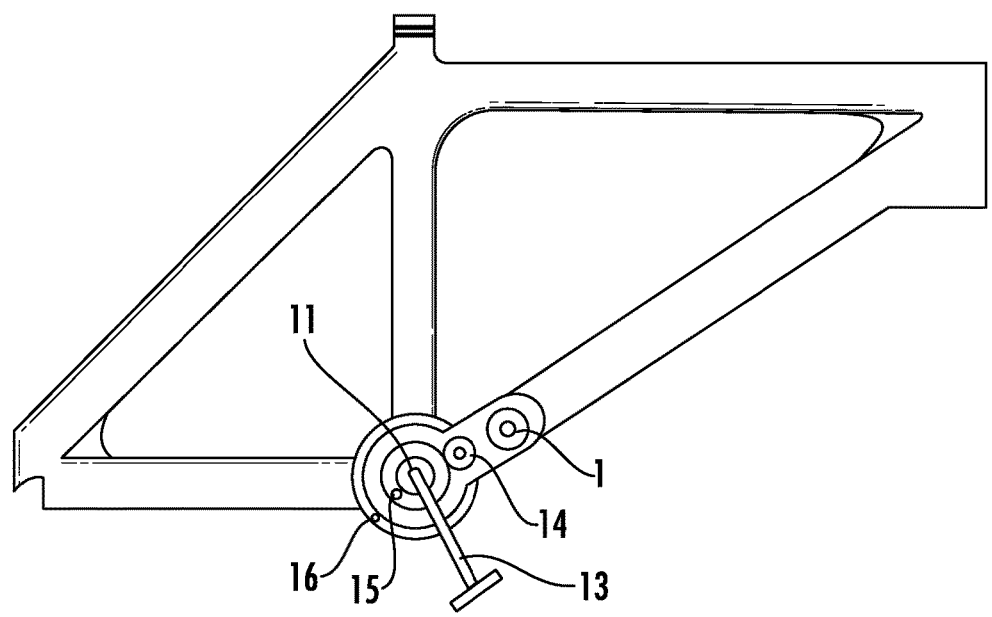
FIG. 4 shows a side view of the system of the present invention, wherein the housing (23, 3) that comprises the bottom bracket (11) and the crank's axle (12) that exists in the bottom bracket (11) is incorporated in the bicycle frame from the design stage already on a bicycle frame.

FIG. 4 shows the system of the present invention mounted on a bicycle which is seen from the bicycle's driving side and the engine housing includes the bottom bracket (11) and crank set axle (13). The engine housing is then fastened directly to the frame.

EXAMPLE

The invention is illustrated with the following example, with reference to the FIGS. 1 to 3.

The invention presents a mid-drive engine (motor) that transmits the power directly to a bicycle's pedals, as shown in FIG. 1 where the crank set of the bicycle is shown as (13) and the front chain ring as (15,16).

The said engine has low weight, such as 1.8 kilograms compared to the four kilograms of the common mid-drive engines. It also has high power (over 2 HP) and small size, in our example (140 mm×100 mm×80 mm).

The said engine is fitted to the bicycle's bottom bracket (11) under the bicycle frame and this in turn gives to the bicycle true center weight distribution. Due to the engine's small size, the bicycle where the engine of the invention is mounted-on has high ground clearance.

The engine's motor may be a Brushless DC outrunner motor that gives us 1200 watts of continuous power from a motor weighting less than 0.600 kilograms.

The motor's speed is in the region between 6000 rpm and 5000 rpm and is reduced to 120 rpm to the crank set (13) by three speed reduction stages.

The gears in the first two reduction stages (2, 4, 5) are made of composite materials or metals in our example, which offer low weight, low friction and low noise. The third, and last in our example, speed reduction stage is a chain drive (14, 15) that gives the possibility to transmit the power from the engine to the majority of the bicycle's front chain rings (15, 16) and transfers high amounts of torque with small weight and size. Most commercially available bicycles have this chain ring and this allows us with the use of the sprocket wheel (14) to have in the 3$^{rd}$ speed reduction stage compatibility with most commercially available bicycles. These may be connected by use of an additional chain that links the third reduction stage sprockets (14,15) to transmit the power from the engine to the pedal crank set.

Alternatively the third reduction stage (14,15) can be gears (spur or helical) or synchronous belt pulleys connected by a synchronous belt.

Also there is a one way bearing (6) mounted to the second reduction stage that allows us to have smaller sprocket (14) to the third reduction stage that lowers the distance between the engine and the bicycle;s bottom bracket. The small distance between sprockets (14,15), is very important, because the nearer they come the bending forces on the mounting brackets (10) between the sprockets (14, 15) are diminished.

The one way bearing (6) serves in that when the rider pedals, the motor (1) is not moving by isolating the transmission of the power from gear (5) to gear (4) so there is no resistance interfering to the rider's motion.

The one way bearing (6), can be on the third reduction stage but in this case we would lose the low distance advantage between the engine and the bottom bracket (11). The parallel plates (3) that support the motor and the reduction stage are made from composites materials such as carbon fiber composites or aluminum alloys. The parallel supporting plates (3) make an enclosure with housing (23) that give us the possibility to place inside the speed controller and electronics.

Finally, the engine is fastened to the bottom bracket (11) with two opposite placed metal brackets that secure the engine from moving and can be unfastened quickly.

An innovation of the present invention is that with the system as described we achieve at least three (3) speed reduction stages in a very small space which is very narrow. The said dimension has the advantage that it does not affect the geometry of the bicycle and most important, it does not affect the distance from the ground and the width of the crank set's (13) axle (12). For example, a standard crank set is of 9 to 12 cm wide, whereas in known electrical mid drive bicycles, the standard width is of 16 to 20 and even 22 cm. This stresses significantly the knees of the rider.

The small size and dimensions of the system for electrical propulsion allows us to use high speed motors of very small size.

Additionally, we have the possibility to attach the said system of the invention to some other location on the bicycle, for example around the axle (12) of the pedal crank set (13) or in a side custom manufactured bicycle frame.

Due to the specific features of the system for electrical propulsion described herein, namely its small size and narrow width, this enables us to use the same system of electrical propulsion and apply it to electrical engines not only for use for the propulsion of bicycles, but also for the propulsion of scooters or any other means of light-weight wheeled transportation vehicles and robotic applications that need light weight, high speed and narrow width.

The invention claimed is:

1. An electrical engine for the propulsion of bicycles, said engine being configured to attach to a bicycle frame
    comprising parallel supporting plates configured to be fastened on a bottom bracket of the bicycle with mounting brackets, and further
    comprising at least three speed reduction stages,
    a planetary drive directly mounted on an output pinion shaft of the motor and an output gear of the motor, as a first stage of speed-reduction,
    at least two gears, a first of the gears mounted to a shaft of the planetary drive and a second of the gears mounted on a one way bearing, as a second stage of speed reduction, and
    an output gear of a shaft of the engine mounted to the one way bearing and a gear mounted to an axle of the bicycle, the output gear being smaller than the gear mounted to an axle of the bicycle, as a third stage of speed reduction
    wherein the shaft of the engine transmits power from the second stage of speed of reduction to the third stage of speed reduction, the shaft of the engine is parallel to the bottom bracket and to the shaft of the motor.

2. The system according to claim 1, wherein the motor is a high speed motor in a range of 4,000 to 10,000 rpm.

3. The system according to claim 1, wherein the engine weight is 1.8 kilograms.

4. The system according to claim 1, wherein the engine has a size of 140 mm×100 mm×80 mm.

5. The system according to claim 1, wherein the one-way bearing is positioned inside the second gear of the second reduction stage, which second gear of the second reduction stage is hollow and the one way bearing is on a non-drive side.

6. The system according to claim 1, wherein
    the parallel supporting plates form an enclosure with a housing within which is located the motor and the first stage of speed reduction, the second stage of speed reduction with a free wheel and a third stage of speed reduction are located outside from the enclosure formed by the parallel plates and the housing.

7. The system of claim 1, which does not need to be a permanent fixture of the bicycle on which it applies, but can be fastened and unfastened at will with no need of particular technical knowledge, while the bicycle remains fully functional.

* * * * *